(12) United States Patent
Saito et al.

(10) Patent No.: US 11,869,691 B2
(45) Date of Patent: Jan. 9, 2024

(54) POWDER MAGNETIC CORE AND ELECTROMAGNETIC PART

(71) Applicants: SUMITOMO ELECTRIC INDUSTRIES, LTD., Osaka (JP); SUMITOMO ELECTRIC SINTERED ALLOY, LTD., Okayama (JP)

(72) Inventors: Tatsuya Saito, Osaka (JP); Asako Watanabe, Osaka (JP); Tomoyuki Ueno, Osaka (JP)

(73) Assignees: SUMITOMO ELECTRIC INDUSTRIES, LTD., Osaka (JP); SUMITOMO ELECTRIC SINTERED ALLOY, LTD., Okayama (JP)

( * ) Notice: Subject to any disclaimer, the term of this patent is extended or adjusted under 35 U.S.C. 154(b) by 691 days.

(21) Appl. No.: 16/619,759

(22) PCT Filed: Jul. 23, 2018

(86) PCT No.: PCT/JP2018/027436
§ 371 (c)(1),
(2) Date: Dec. 5, 2019

(87) PCT Pub. No.: WO2019/031209
PCT Pub. Date: Feb. 14, 2019

(65) Prior Publication Data
US 2020/0143973 A1    May 7, 2020

(30) Foreign Application Priority Data
Aug. 10, 2017   (JP) .................................. 2017-156041

(51) Int. Cl.
*H01F 27/255*    (2006.01)
*H01F 27/28*    (2006.01)
(Continued)

(52) U.S. Cl.
CPC ............. *H01F 1/26* (2013.01); *H01F 27/255* (2013.01); *H01F 27/28* (2013.01); *H01F 41/0246* (2013.01)

(58) Field of Classification Search
CPC ...... B22F 3/00; B22F 3/24; H01F 1/24; H01F 1/26; H01F 27/255; H01F 27/28;
(Continued)

(56) References Cited

U.S. PATENT DOCUMENTS 5,451,306 A    9/1995   Nakamura et al.
7,608,968 B2 *  10/2009  Toyoda .................. H02K 1/148
                                                336/233
(Continued)

FOREIGN PATENT DOCUMENTS

JP    H06-327199    11/1994
JP    H11-341751    12/1999
(Continued)

OTHER PUBLICATIONS

English Machine Translation: Nakamura et al. (JP 06-327199).*
(Continued)

*Primary Examiner* — Holly Rickman
*Assistant Examiner* — Linda N Chau
(74) *Attorney, Agent, or Firm* — IPUSA, PLLC

(57) ABSTRACT

A powder magnetic core includes a compact including soft magnetic powder, and an insulating-resin coating that covers a portion of a surface of the compact. A ratio of an area of the insulating-resin coating to a surface area of the compact is lower than or equal to 85%, and a maximum depth of unevenness on a surface of the insulating-resin coating is smaller than or equal to 20 μm.

8 Claims, 2 Drawing Sheets

(51) Int. Cl.
  *H01F 1/26* (2006.01)
  *H01F 41/02* (2006.01)
(58) Field of Classification Search
  CPC .......... H01F 3/08; H01F 41/0246; H01F 1/22;
             H01F 41/02; H02K 1/02; G09G
             2320/0606
  See application file for complete search history.

(56) References Cited

U.S. PATENT DOCUMENTS

| | | | |
|---|---|---|---|
| 2007/0172380 | A1 | 7/2007 | Tatsumoto et al. |
| 2008/0067887 | A1 | 3/2008 | Toyoda et al. |
| 2009/0085422 | A1* | 4/2009 | Kusawake ............. H02K 1/148 310/216.069 |
| 2013/0038420 | A1 | 2/2013 | Uozumi et al. |

FOREIGN PATENT DOCUMENTS

| | | |
|---|---|---|
| JP | 2003-309015 | 10/2003 |
| JP | 2004-242443 | 8/2004 |
| JP | 2005-295684 | 10/2005 |
| JP | 2007-215334 | 8/2007 |
| JP | 2007-224412 | 9/2007 |
| JP | 2009-044788 | 2/2009 |
| JP | 2013-143406 | 7/2013 |
| JP | 2014-072245 | 4/2014 |
| JP | 2016-127042 | 7/2016 |
| WO | 2005/107039 | 11/2005 |
| WO | 2012/081737 | 6/2012 |

OTHER PUBLICATIONS

English Machine Translation: Fan et al. (JP 2016-127042).*
English Machine Translation: Morimoto et al. (JP 2005-295684) (Year: 2005).*
English Machine Translation: Yoshino et al. (JP 11-341751) (Year: 1999).*
English Machine Translation: Tsuruta et al. (JP 05-316699) (Year: 1993).*

* cited by examiner

POWDER MAGNETIC CORE AND ELECTROMAGNETIC PART

TECHNICAL FIELD

The present disclosure relates to a powder magnetic core and an electromagnetic part. The present application claims priority to Japanese Patent Application No. 2017-156041, filed Aug. 10, 2017, the contents of which are incorporated herein by reference in their entirety.

BACKGROUND ART

Electromagnetic parts such as motors in which coils are each disposed on a magnetic core (core), choke coils, or reactors have been known. In recent years, powder magnetic cores have been used as magnetic cores for electromagnetic parts. In general, such a powder magnetic core is configured by a compact in which soft magnetic powder is compacted.

Patent Document 1 discloses a powder magnetic core that includes a molded body (compact), in which coated soft magnetic powder having an insulating film on a particle surface of soft magnetic powder is compacted, and that includes a rust-preventive layer that covers the entire surface of the molded body.

CITATION LIST

Patent Literature

[PTL 1] Japanese Unexamined Patent Application Publication No. 2014-72245

SUMMARY OF INVENTION

A powder magnetic core in the present disclosure includes:
a compact including soft magnetic powder; and
an insulating-resin coating that covers a portion of a surface of the compact,
wherein a ratio of an area of the insulating-resin coating to a surface area of the compact is lower than or equal to 85%, and wherein a maximum depth of unevenness on a surface of the insulating-resin coating is smaller than or equal to 20 μm.

An electromagnetic part in the present disclosure includes:
the powder magnetic core in the present disclosure; and a coil disposed on the powder magnetic core.

DESCRIPTION OF EMBODIMENTS

Figure 1:
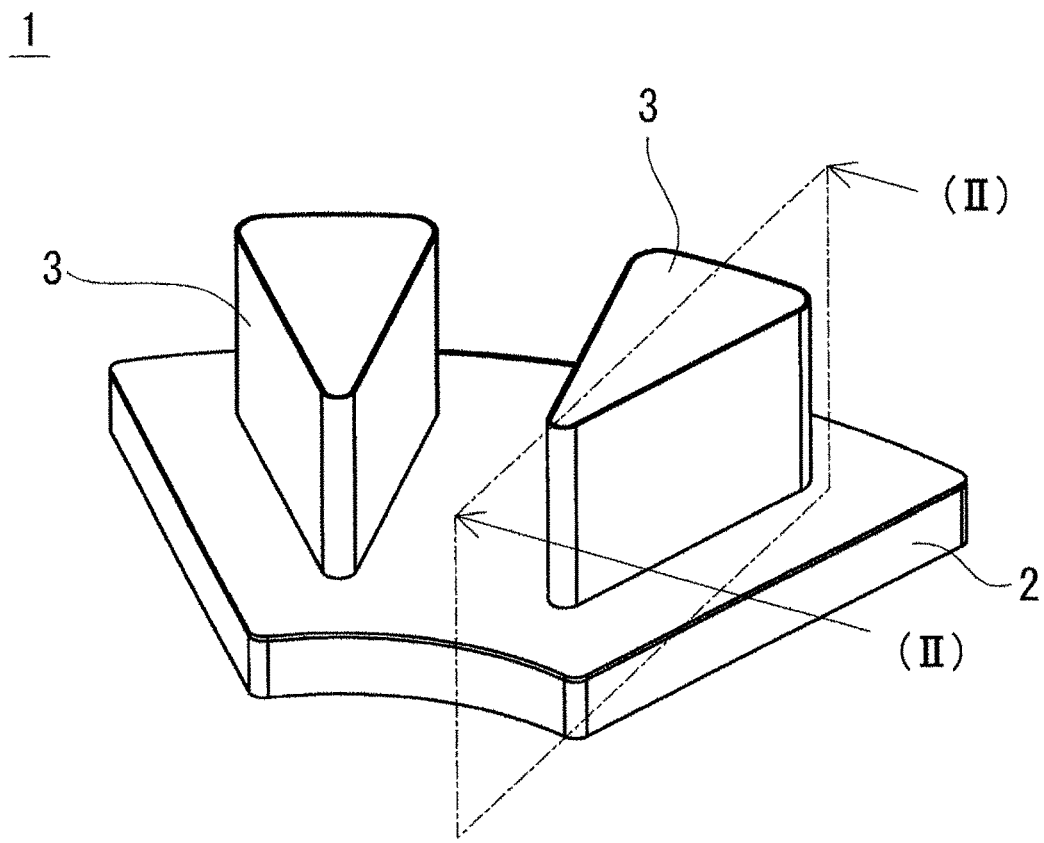
FIG. 1 is a schematic diagram for explaining an example of a powder magnetic core according to an embodiment in the present disclosure.

Problems to be Solved by the Present Disclosure

With respect to an electromagnetic part, in order to ensure electric insulation between a powder magnetic core and a coil, an insulating paper has been interposed between the powder magnetic core and the coil, or has been placed via a resin bobbin. However, in a configuration in which the insulating paper or the bobbin is used to ensure insulation, a distance between the powder magnetic core and the coil is increased, and thus an excessive current may be required to flow to the coil, or an assembly work may be complicated.

As one manner of ensuring insulation between a powder magnetic core and a coil, for example, it is considered to paint a surface of a compact with resin to form an insulating-resin coating. When the insulating-resin coating is formed, a coil can be directly disposed on the powder magnetic core, and a current flowing to the coil is not required to be increased more than necessary. A current flowing to the coil can be thus reduced. Further, the size of a given electromagnetic part can be reduced compared to a case where an insulating paper or a bobbin is used, as well as enabling to reduce the number of parts and to simplify assembly work.

The insulating-resin coating is required to provide increased electric insulation, and it is desirable that there is no pinhole or portion having a locally thin film thickness. If a pinhole or a locally thin portion is present even in one portion in the insulating-resin coating, such a portion is an origin of a dielectric breakdown, and thus electric insulation (withstanding voltage) is decreased.

In view of the issue described above, one objective of the present disclosure is to provide a powder magnetic core with an insulating-resin coating that provides increased electric insulation. Another object is to provide an electromagnetic part that can ensure electric insulation between a powder magnetic core and a coil by using an insulating-resin coating provided on the powder magnetic core.

Effect of the Present Disclosure

A powder magnetic core in the present disclosure includes an insulating-resin coating with increased electric insulation. An electromagnetic part in the present disclosure can ensure electric insulation between a powder magnetic core and a coil by using an insulating-resin coating provided on the powder magnetic core.

Description of Embodiments of the Present Disclosure

As a result of careful consideration for a method of forming an insulating-resin coating with increased electric insulation on a surface of a compact, the inventors have recognized the following.

Since a compact is formed by compacting powder, multiple pores are present, and thus the compact has unevenness on the surface. After the surface of the compact is painted with resin, an insulating-resin coating can be formed by accomplishing heat treatment to solidify the resin.

In a case of painting the surface of compact with the resin to form the insulating-resin coating, during heat treatment and after painting, the air in pores in the compact is thermally expanded to attempt to escape outside. When the resin is painted on the entire surface of a given compact, the entire surface of the compact is covered by the resin. In such a manner, there is no path of escaping the air, and the air that attempts to escape outside may penetrate the resin, which may cause the generation of pinholes in the insulating-resin coating. Particularly, when a pinhole diameter is 100 μm or more, electric insulation is largely affected.

Also, since the insulating-resin coating is suitably formed on the surface of the compact, the insulating-resin coating has unevenness formed on the surface thereof. The unevenness on the surface of the insulating-resin coating is increased as unevenness on a surface of the compact increases and roughness increases. In other words, surface roughness also tends to increase. When the unevenness (roughness) on the surface of the compact is increased, a thickness of the resin is not uniform in a case of resin being painted on the surface of the compact, and thus a thin portion of the resin may be formed. For example, resin may enter a deep portion (valley portion) of unevenness on a compact surface, and the resin may be thin at such a portion. In this case, there is a deep portion of unevenness on the surface of a given insulating-resin coating, and it is highly likely that a portion having a thin film thickness is locally formed in the insulating-resin coating. In some cases, a film thickness of the insulating-resin coating may be too thin at a deep portion of unevenness, and thus a pinhole may be formed.

From the points as recognized, the inventors have found that, when an insulating-resin coating is formed on a portion of a surface of a given compact instead of the entire surface, and depth of unevenness on the surface of the insulating-resin coating is decreased, the insulating-resin coating does not have pinholes or locally thin portions, and thus an insulating-resin coating with increased electric insulation is obtained. First, embodiments in the present disclosure will be described by listing.

(1) A powder magnetic core in the present disclosure includes:

a compact including soft magnetic powder; and an insulating-resin coating that covers a portion of a surface of the compact, wherein a ratio of an area of the insulating-resin coating to a surface area of the compact is lower than or equal to 85%, and wherein a maximum depth of unevenness on a surface of the insulating-resin coating is smaller than or equal to 20 µm.

With respect to the above powder magnetic core, the portion of the surface of the compact is covered by the insulating-resin coating. The ratio of the area of the insulating-resin coating to the surface of the compact is lower than or equal to 85%. With respect to the powder magnetic core, because the insulating-resin coating is formed on the portion of the surface of the compact, resin is painted on the portion instead of the entire surface of the compact. In other words, in a case of painting resin on the surface of the compact to form the insulating-resin coating, the surface of the compact has a painted surface that is painted with resin, and has a non-painted surface that is not painted with resin. That is, the entire surface of the compact is not covered by the resin. For this reason, even if the air in pores in the compact is thermally expanded during heat treatment and after painting, the air can escape from the non-painted surface of the surface of the compact. Because the thermally expanded air in the pores can avoid penetrating the resin on a painted surface and escaping, generation of pinholes can be prevented. Further, with the ratio of the area of the insulating-resin coating being lower than or equal to 85%, an area of a non-painted surface that causes a path of escaping the air can be efficiently ensured, and thus the pinholes can be effectively prevented from being generated in the insulating-resin coating. The insulating-resin coating may be formed on at least a portion of the surface of the compact where electric insulation is required. For example, when a coil is disposed on a powder magnetic core to configure an electromagnetic part, it is provided on a surface contacting the coil on the powder magnetic core. A lower limit of an area ratio of the insulating-resin coating is higher than or equal to 25%, for example.

Further, according to the powder magnetic core described above, with the maximum depth of unevenness on the surface of the insulating-resin coating being smaller than or equal to 20 µm, it is unlikely that a portion having a thin film thickness is locally formed in the insulating-resin coating. In this regard, with the maximum depth of unevenness on the surface of the insulating-resin coating being smaller than or equal to 20 µm, unevenness (roughness) on the surface of the compact is decreased, and thus a thin portion of resin is not easily formed in a case of painting the resin on the surface of the compact. A lower limit of the maximum depth of the unevenness on the surface of the insulating-resin coating is not particularly restricted. For example, the lower limit is greater than or equal to 1 µm, from the viewpoint of surface quality of the compact, or the like. A method of measuring the maximum depth of the unevenness on the surface of the insulating-resin coating will be described below.

As described above, the powder magnetic core includes the insulating-resin coating with increased electric insulation, in a manner such that the pinhole or portion having a locally thin film thickness is not formed.

(2) As one aspect of the powder magnetic core, relative density of the compact is higher than or equal to 90% and a maximum depth of unevenness on the surface of the compact is smaller than or equal to 50 µm.

Unevenness (roughness) on the surface of a given compact is more likely to decrease as relative density of the compact is increased. With the relative density of the compact being higher than or equal to 90% and the maximum depth of unevenness on the surface of a given compact being smaller than or equal to 50 µm, a thin portion of resin is not easily formed in a case of painting the resin on the surface of the compact. Thereby, a thin portion can be prevented from being locally formed in the insulating-resin coating. An upper limit of the relative density of the compact is not particularly restricted. For example, the upper limit is lower than or equal to 99%, in terms of a manufacturing condition of the compact, or the like. The "relative density" herein means actual density relative to true density (percentage of [measured density of a compact/true density of the compact]). The true density refers to density of the soft magnetic powder contained in a compact.

(3) As one aspect of the powder magnetic core, the insulating-resin coating has a thickness of from 25 µm to 100 µm.

With the thickness of the insulating-resin coating being greater than or equal to 25 µm, electric insulation for the insulating-resin coating can be sufficiently ensured. With the thickness of the insulating-resin coating being smaller than or equal to 100 µm, the insulating-resin coating is not too thick, and the compact and a coil can be disposed in proximity to each other when an electromagnetic part is configured. Thereby, a current flowing to the coil can be reduced, as well as reducing the size of the electromagnetic part.

(4) As one aspect of the powder magnetic core, a breakdown voltage across the insulating-resin coating exceeds 600 V.

When the breakdown voltage across the insulating-resin coating exceeds 600 V, electric insulation (withstanding voltage) for the insulating-resin coating is sufficiently increased. An upper limit of the breakdown voltage across the insulating-resin coating is not particularly restricted. For example, the upper limit is lower than or equal to 3000V, in terms of insulating characteristics of resin forming an insulating-resin coating, or a coating thickness (film thickness), or the like. A method of measuring the breakdown voltage across the insulating-resin coating will be described below.

(5) As one aspect of the powder magnetic core, the insulating-resin coating includes at least one of epoxy based resin, fluorine based resin, and polyimide based resin.

The insulating-resin coating is formed of resin with electric insulation. It is preferable that the resin forming the insulating-resin coating provides increased electric insulation and has good adhesion to the compact. Further, it is preferable that the resin forming the insulating-resin coating has increased heat resistance, because the powder magnetic core is at high temperature in use of an electromagnetic part. Epoxy based resin, fluorine based resin, and polyimide based resin each have excellent adhesion and heat resistance with electric insulation, and are each suitable for resin that forms an insulating-resin coating.

(6) As one aspect of the powder magnetic core, the insulating-resin coating includes filler(s) including an oxide or a nitride, the oxide or the nitride including at least one element selected from among Mg, Si, Al, Mo, Ca, Ti, and Zn.

With the insulating-resin coating including the filler(s), a plurality of fillers are dispersed in the insulating-resin coating, and thus electric insulation for the insulating-resin coating can be improved. Specifically, pinhole(s) extending in a thickness direction of the insulating-resin coating are divided by the fillers, and thus it becomes possible to further effectively prevent generation of a pinhole penetrating in a coating thickness direction towards the surface of the compact from the surface of the insulating-resin coating. Further, filler(s) formed of an oxide or a nitride, which includes at least one element selected from among Mg, Si, Al, Mo, Ca, Ti, and Zn, have increased electric resistance, thereby allowing an improvement in insulating characteristics of resin. Further, with the insulating-resin coating including the filler (s), in a case of forming the insulating-resin coating on a surface of a corner section in the compact (particularly in resin painting), movement from the corner section to a flat face section with respect to resin that is not solidified is easily suppressed. For this reason, a given insulating-resin coating covering the corner section of the compact can be prevented from being thin locally. Accordingly, it is possible to improve a ratio of a thickness of a given insulating-resin coating covering a corner section to a thickness of a given insulating-resin coating covering a flat face section.

(7) As one aspect of the powder magnetic core, the compact includes flat face section(s) and corner section(s), the insulating-resin coating that covers a given corner section has a thickness of from 25 µm to 100 µm, and
a thickness of the insulating-resin coating that covers a given flat face section is 0.7 to 1.3 times the thickness of the insulating-resin coating that covers the corner section.

With the thickness of a given insulating-resin coating that covers a given corner section of the compact being greater than or equal to 25 µm, electric insulation can be sufficiently ensured at the given corner section. With the thickness of a given insulating-resin coating that covers a given corner section being smaller than or equal to 100 µm, the insulating-resin coating is not too thick at the given corner section. Thereby, when an electromagnetic part is configured, it is possible to reduce a current flowing to a coil and to reduce the electromagnetic part in size, as well as ability to dispose the compact and the coil in proximity to each other, or the like. Further, with a thickness of a given insulating-resin coating that covers a given flat face section of a compact being 0.7 to 1.3 times the thickness of the insulating-resin coating that covers a given corner section, electric insulation with respect to the flat face section can be ensured, as well as reductions in a current flowing to a coil and reductions in the size of a given electromagnetic part.

(8) As one aspect of the powder magnetic core, the compact includes a phosphate coating in a surface layer of the compact.

With the compact including the phosphate coating, unevenness (roughness) on the surface of the compact is decreased. This is because the surface of the compact is sealed by accomplishing phosphate treatment of the compact to form a phosphate coating on the surface. Further, with the phosphate coating being included, it becomes possible to expect to increase adhesion of the insulating resin coating. Examples of the phosphate coating include coatings such as zinc phosphate system, iron phosphate system, manganese phosphate system, and calcium phosphate system.

(9) An electromagnetic part in the present disclosure includes:
the powder magnetic core according to any one of (1) to (8) above; and a coil disposed on the powder magnetic core.

With respect to the electromagnetic part, the powder magnetic core in the present disclosure is used, and an insulating-resin coating with increased electric insulation is formed on the surface of the powder magnetic core. Thereby, with respect to the electromagnetic part, electric insulation between the core and the coil can be ensured by the insulating-resin coating provided on the powder magnetic core. An example of the electromagnetic part includes a motor, a choke coil, a reactor, or the like.

Details of Embodiments of the Present Disclosure

Hereafter, specific examples of a powder magnetic core and an electromagnetic part according to embodiments of the present disclosure will be described. The present disclosure is not limited to these examples, and is set forth by the claims and is intended to include all modifications implementing the equivalent and made within the scope of the claims.

<Powder Magnetic Core>

Figure 2:
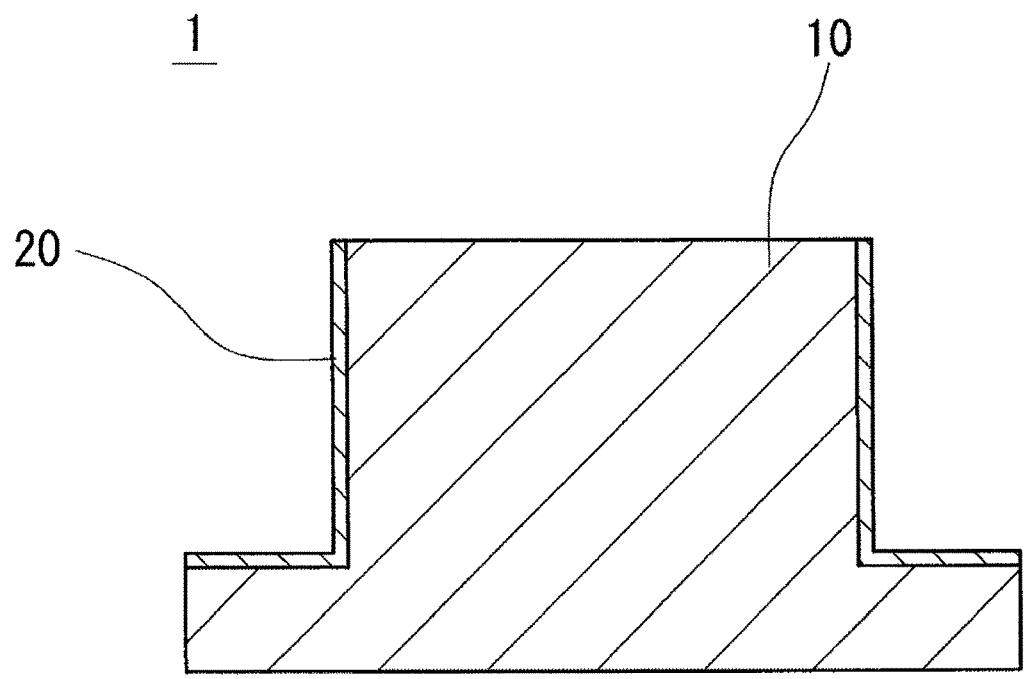
FIG. 2 is a cross-sectional view taken along the (II)-(II) line in FIG. 1.

With reference to FIGS. 1 and 2, a powder magnetic core according to the embodiment will be described. FIG. 1 is a schematic perspective view of a powder magnetic core 1. FIG. 2 is a cross-section view taken along the (II)-(II) line illustrated in FIG. 1. A powder magnetic core 1 includes a compact 10 including soft magnetic powder, and includes an insulating-resin coating 20 that covers a portion of a surface of the compact 10. As one of features of the powder magnetic core 1 according to the embodiment, a ratio of an area of the insulating-resin coating 20 to a surface area of the compact 10 is lower than or equal to 85% and a maximum depth of unevenness on the surface of the insulating-resin coating 20 is smaller than or equal to 20 µm. A configuration of the powder magnetic core 1 will be described in detail below.

The powder magnetic core 1 (compact 10) illustrated in FIG. 1 is a part that constitutes part of a stator core used in an axial gap motor, and includes a fan yoke section 2 and teeth sections 3 protruding from the yoke section 2. The stator core is configured by assembling the powder magnetic core 1 with a group of six so as to be annular, and a coil that is not shown is wound along an outer circumference of each teeth section 3. Also, with respect to the powder magnetic core 1, a portion of the surface of the compact 10 is covered by the insulating-resin coating 20. In this example, an outer periphery of each teeth section 3 and an upper surface of the yoke section 2 from which each teeth section 3 is protruded, are covered by the insulating-resin coating 20. The shape of the powder magnetic core 1 (compact 10) can be appropriately selected depending on application, or the like. For example, a tubular shape such as a cylindrical tube or a rectangular tube, or a columnar shape such as a cylindrical column or a rectangular column is used.

<Compact>

The compact 10 is manufactured by filling soft magnetic powder into a mold to compact it, for example. The compact 10 includes soft magnetic powder. The soft magnetic powder is powder formed of soft magnetic material. The soft magnetic powder consists of multiple particles. An example of the soft magnetic material includes pure iron (purity of 99% by mass or more), or an iron base alloy such as a Fe—Si—Al based alloy (sendust), a Fe—Si based alloy (silicon steel), a Fe—Al based alloy or a Fe—Ni based alloy (permaloy). For example, atomizing powder (water atomizing powder, gas atomizing powder), carbonyl powder, reduced powder, or the like can be used as the soft magnetic powder.

A particle surface of the soft magnetic powder may be coated with an insulating film. Thereby, the insulating film is interposed between the particles of the soft magnetic powder that forms the compact 10, and thus electric insulation between the particles can be increased. Accordingly, eddy current loss of the powder magnetic core 1 can be reduced. An example of the insulating film includes a resin film such as silicone, or an inorganic oxide film such as silica. A film thickness of the insulating film is in the range of from 20 nm or 1 µm, for example. Powder known in the art can be used as the soft magnetic powder.

(Mean Particle Size of Soft Magnetic Powder)

The mean particle size of the soft magnetic powder is preferably in the range of from 20 µm to 300 µm. With the mean particle size of the soft magnetic powder being greater than or equal to 20 µm, oxidation of the soft magnetic powder can be suppressed in compacting. Further, fluidity of the powder is increased and thus fillings of the powder into a mold can be improved. With the mean particle size of the soft magnetic powder being smaller than or equal to 300 µm, compressibility of the powder is increased in compacting, and thus the compact 10 can be highly densified. Unevenness (roughness) on the surface of the compact 10 is more likely to decrease as the mean particle size of the soft magnetic powder is decreased. The mean particle size of the soft magnetic powder can be calculated by the following: observing a cross-section of the compact 10 with a microscope such as a scanning electron microscope (SEM); measuring an equivalent circle diameter (cross-sectional equivalent circle diameter) derived from a cross-sectional area of each particle with respect to all particles of soft magnetic powder in a field of view; and calculating their mean value. In the present embodiment, a field area is set such that 100 or more particles are observed in one field of view, and a mean value of cross-sectional equivalent circle diameters of the particles, which are observed in 10 different fields of view and are measured, is set as the mean particle size of the soft magnetic powder. For example, a field area is in the range of from 1.0 to 4.5 mm², and magnification is in the range of from 50 to 100 times. Note that when an insulating film is disposed on a particle surface of the soft magnetic powder, the mean particle size of the soft magnetic powder does not cover a given insulating film. The respective mean particle sizes of the soft magnetic powder are approximately equal before and after compacting. More preferably, for example, the mean particle size of the soft magnetic powder is in the range of from 40 µm to 250 µm.

(Surface Quality of Compact)

It is preferable that unevenness (roughness) on the surface of the compact 10 be decreased. For example, a maximum depth of the unevenness on the surface of the compact 10 is 50 µm or less, and preferably 35 µm or less. In a case of painting resin on a surface of the compact 10 to form the insulating-resin coating 20, a thin portion of resin is not easily formed as the unevenness (roughness) on the surface of the compact 10 decreases. Thereby, a pinhole or a portion having a locally thin film thickness can be effectively prevented from being formed in the insulating-resin coating 20. When a maximum depth of the unevenness on the surface of the compact 10 is smaller than or equal to 50 µm, the depth of the unevenness on the surface of the insulating-resin coating 20 is sufficiently decreased, and thus the maximum depth of the unevenness on the surface of the insulating-resin coating 20 can be smaller than or equal to 20 µm. A lower limit of the maximum depth of the unevenness on the surface of the compact 10 is not particularly restricted. In terms of a manufacturing condition of the compact 10, or the like, for example, the lower limit is greater than or equal to 5 µm. The maximum depth of the unevenness on the surface of the compact 10 is, for example, 30 µm or less, and more preferably 25 µm or less.

Figure 3:
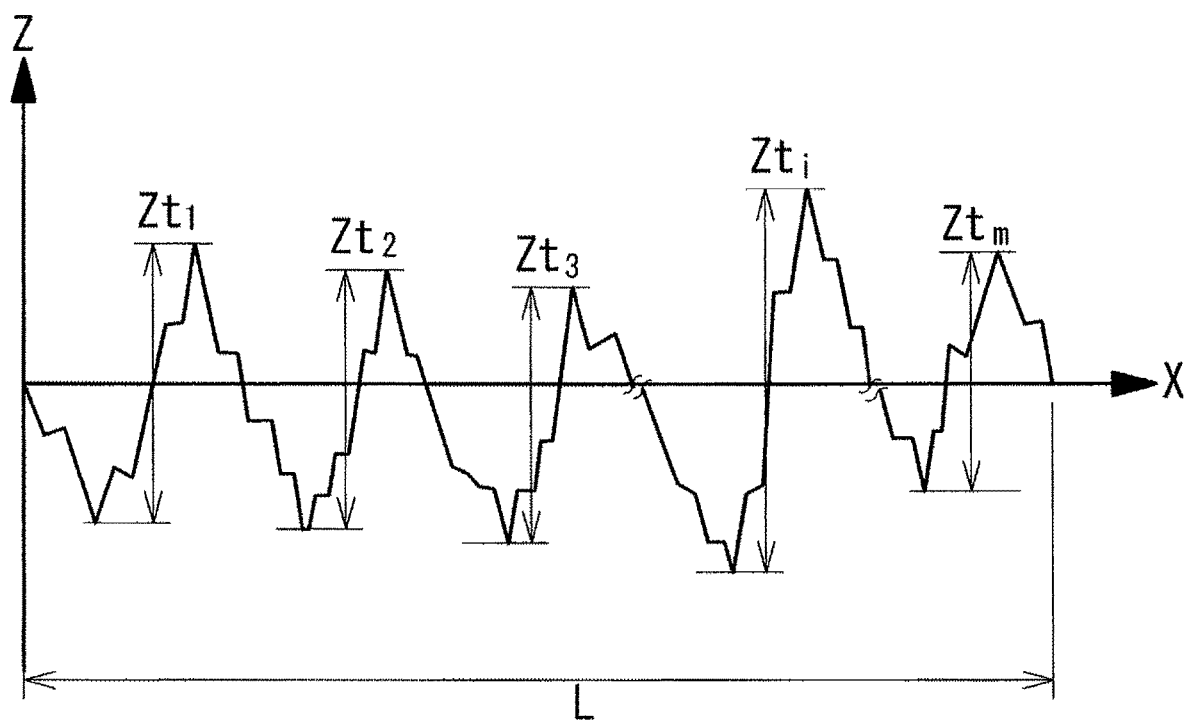
FIG. 3 is a diagram for explaining a method of measuring a maximum depth of unevenness.

The maximum depth of unevenness on the surface of a given compact can be calculated as a greatest value with respect to height of a roughness curve element, in terms of the surface of the compact 10. The "roughness curve element" means a curved portion that has a set of adjacent peak and valley with respect to a given roughness curve. The "peak" refers to an upper portion with respect to an X axis (mean line) along which the roughness curve is indicated. The "valley" refers to a lower portion with respect to the X axis (mean line) along which the roughness curve is indicated. "Height of the roughness curve element" is expressed by the sum of peak height and valley depth with respect to a given one roughness curve element. The "peak height" refers to height from the X axis to the top peak, and the "valley depth" refers to depth from the X axis to the bottom of the valley. Referring to FIG. 3, a method of measuring the maximum depth of the unevenness on the surface of the compact 10 will be described. As illustrated in FIG. 3, a roughness curve with respect to the surface of the compact 10 is acquired, and only reference length L is drawn in a direction of a mean line, from the acquired roughness curve. The mean line associated with a drawn portion is defined as an X axis, and a height direction is defined as a Z axis; subsequently, with respect to each roughness curve element, peak height and valley depth are measured, and then height $Zt$ ($=Zt_1, Zt_2, Zt_3, \ldots Zt_i, \ldots Zt_m$) of each roughness curve element is calculated. Further, for the reference length L, a greatest value (in the case of FIG. 3, $Zt_i$) with respect to the height Zt of the roughness curve elements is set as the maximum depth of the unevenness.

A given roughness curve with respect to the surface of the compact 10 may be obtained by observing a cross section of the compact 10 with a SEM, or the like to extract contours of a surface from an observed image, or alternatively, it is obtained by measuring the surface of the compact 10, with a surface-roughness measuring instrument. As the surface-roughness measuring instrument, a device known in the art, such as a contact type using a touch needle or a non-contact type using laser light, can be used.

(Relative Density of Compact)

Preferably, relative density of the compact 10 is higher than or equal to 90%. The pore decreases as the relative density of the compact 10 is increased. For this reason, the unevenness (roughness) on the surface of the compact 10 is more likely to be decreased. When the relative density of the compact 10 is higher than or equal to 90%, the unevenness (roughness) on the surface of the compact 10 is sufficiently decreased, and a thin portion of resin is not easily formed when the surface of the compact 10 is painted with resin. Thereby, a portion having a thin film thickness can be effectively prevented from being locally formed in the insulating-resin coating 20. The relative density of the compact 10 can be calculated by dividing actual density of the compact 10 by true density. In the present embodiment, density of the soft magnetic material of which soft magnetic powder is formed is set as true density. An upper limit of the relative density of the compact 10 is not particularly restricted. For example, in terms of a manufacturing condition of the compact 10, or the like, the upper limit is lower than or equal to 99%. The relative density of the compact 10 is, for example, 92% or more, and more preferably 94% or more.

The compact 10 can be highly densified as compacting pressure is increased in compacting soft magnetic powder, and thus relative density of the compact 10 is increased. For example, the compacting pressure is in the range of from 600 MPa to 1500 MPa. Also, in order to increase compatibility of the soft magnetic powder, for example, a mold may be heated and warm pressing may be performed. In the case of the warm pressing, for example, compacting temperature (molding temperature) may be in the range of from 60 to 200 degrees C. Further, in a case of compacting soft magnetic powder, a lubricant may be added to the soft magnetic powder in order to reduce friction between the soft magnetic powder and a given mold, as well as between particles of the soft magnetic powder. As the lubricant, a solid lubricant such as a fatty acid amide or a metallic soap can be used. For example, the fatty acid amide includes a fatty acid amide such as an amide stearate or an amide ethylene bistearate, and the metallic soap includes metallic stearate such as zinc stearate or lithium stearate.

After compacting, the compact 10 may be heat-treated in order to remove deformation produced during compacting. Thereby, magnetic characteristics of the compact 1 can be improved. For example, heating temperature is in the range of from 300 to 900 degrees C.

(Phosphate Coating)

The compact 10 may include a phosphate coating (not shown) in a surface layer of the compact. By accomplishing phosphate treatment of the compact 10 to form a phosphate coating on the surface, the surface of the compact 10 is sealed, and thus unevenness (roughness) on the surface of the compact 10 is decreased. Further, with the phosphate coating being included, an effect of increasing adhesion of the insulating-resin coating 20 can be expected. Examples of the phosphate coating include coatings such as zinc phosphate system, iron phosphate system, manganese phosphate system, and calcium phosphate system.

The phosphate coating can be formed by accomplishing phosphate treatment of the compact 10, by using a phosphate solution. Specifically, the phosphate treatment includes: spraying a phosphate solution onto the surface of the compact 10; or immersing the compact 10 in a phosphate solution, etc. With the phosphate treatment, a phosphate coating is chemically produced on the surface of the compact 10.

A film thickness of the phosphate coating is not particularly restricted. The thickness of the phosphate coating is, for example, in the range of from 1 μm to 10 μm, and preferably in the range of from 2 μm to 7 μm, because the sufficient effect cannot be obtained if it is too thin; or processing time is increased if it is too thick.

A film thickness of a given phosphate coating can be calculated by observing cross-sections perpendicular to the surface of the phosphate coating, with a SEM, or the like to measure film thicknesses; and calculating their mean value. In the present embodiment, respective film thicknesses at 10 points are measured per field of view, and a mean value of the film thicknesses, which are measured by observing them in 10 different fields of view, is set as the film thickness of the phosphate coating. For example, magnification of the SEM is 1000 times (7000 μm²/field of view).

<Insulating-Resin Coating>

By painting a portion of the surface of the compact 10 (in this example, the outer surface of each teeth section 3 and the top surface of the yoke section 2) with resin that provides electric insulation, the insulating-resin coating 20 is formed, and covers a portion of the surface of the compact 10. The insulating-resin coating 20 may be formed on at least a portion of the surface of the compact 10 where electric insulation is required. For example, the insulating-resin coating 20 is provided on a surface which contacts a coil, when the coil is disposed on the powder magnetic core and an electromagnetic part is configured.

The insulating-resin coating 20 is formed of resin with electric insulation. The insulating-resin coating 20 preferably includes at least one of epoxy based resin, fluorine based resin, and polyimide based resin, for example. Preferably, resin forming the insulating-resin coating 20 provides increased electric insulation and has good adhesion to a compact. Further, the resin forming the insulating-resin coating 20 preferably has high heat resistance, because a powder magnet core is at high temperature in use of an electromagnetic part. The epoxy based resin, fluorine based resin, and polyimide based resin are each excellent in adhesion and heat resistance, as well as providing electric insulation. Thereby, such resin is suitable for resin forming the insulating-resin coating 20. The resin forming the insulating-resin coating 20 may include filler(s) as described below.

(Method of Forming Insulating-Resin Coating)

After resin is painted on the surface of the compact 10, the insulating-resin coating 20 can be formed by accomplishing heat treatment to solidify the resin. For example, a method of resin painting includes: spraying the surface of the compact 10 with a resin solution in which resin is dissolved in a solvent; or immersing the compact 10 in a resin solution. Further, the resin painting can be also achieved by electrodeposition coating, powder coating, or the like. In the present embodiment, in order to form the insulating-resin coating 20 on a portion of the surface of the compact 10, resin is painted on the portion of the surface of the compact 10. In such a manner, when the portion of the surface of the compact 10 is painted with resin, it is preferable to mask a non-painted surface (in this example, an upper surface of each teeth section 3, and a circumferential surface and a lower surface of the yoke section 2) in the surface of the compact 10 that is not painted with resin. For example, such a masking method includes attaching masking tape such as Kapton (registered trademark) tape, to a non-painted surface. The masking tape is peeled off before heat treatment and after painting, and then a non-painted surface is exposed during the heat treatment. Heat treatment temperature at which resin is solidified depends on the type of resin, and is in the range of from 40 to 150 degrees C., for example.

(Area Ratio of Insulating-Resin Coating)

A ratio of an area of the insulating-resin coating 20 to a surface area of the compact 10 is lower than equal to 85%. With respect to the powder magnetic core 1, the insulating-resin coating 20 is formed on a portion of the surface of the compact 10. For this reason, in a case of painting resin on the surface of the compact 10 to form the insulating-resin coating 20, a painted surface that is painted with resin is present, as well as a non-painted surface that is not painted with the resin. This non-painted surface serves as a path of escaping the air in pores in the compact 10 during heat treatment and after painting. Thereby, the thermally expanded air is prevented from penetrating the resin on the painted surface and escaping, and thus generation of pinholes is prevented. When a ratio of an area of the insulating-resin coating 20 is lower than or equal to 85%, an area of a non-painted surface, which serves as a path of the air escaping, can be sufficiently secured. Thereby, the pinholes are effectively prevented from being generated in the insulating-resin coating 20. A lower limit of the area ratio of the insulating-resin coating 20 is determined by an area of at least a portion (e.g., a contact surface with a coil) of the compact 10 (powder magnetic core 1) where electric insulation is required. The lower limit is higher than or equal to 25%, for example.

The ratio of the area of the insulating-resin coating 20 can be calculated by dividing the area of the insulating-resin coating 20 (the area of the painted surface of the compact 10) by the surface area of the compact 10.

(Maximum Depth of Unevenness on Surface of Insulating-Resin Coating)

A maximum depth of unevenness on the surface of the insulating-resin coating 20 is smaller than or equal to 20 µm. The insulating-resin coating 20 is suitably formed on the surface of the compact 10. In this regard, surface quality of the insulating-resin coating 20 depends on surface quality of the compact 10. For example, the maximum depth of the unevenness on the surface of the insulating-resin coating 20 tends to decrease as a maximum depth of the unevenness on the surface of the compact 10 is decreased. When the maximum depth of the unevenness on the surface of the insulating-resin coating 20 is smaller than or equal to 20 µm, it is unlikely that a portion having a thin film thickness is locally formed in the insulating-resin coating 20. When the maximum depth of the unevenness on the surface of the insulating-resin coating 20 is smaller than or equal to 20 µm, the maximum depth of the unevenness on the compact 10 is decreased. This is because a thin portion of resin is not easily formed in a case of painting the resin on the surface of the compact 10. Also, the pinhole is not formed because a resin thickness is prevented from being too thin. A lower limit of the maximum depth of the unevenness on the surface of the insulating-resin coating 20 is not particularly restricted. From the viewpoint of surface quality of the compact 10, or the like, for example, the lower limit is greater than or equal to 1 µm. The maximum depth of the unevenness on the surface of the insulating-resin coating is, for example, 15 µm or less, and preferably 10 µm or less.

The maximum depth of unevenness on the surface of the insulating-resin coating 20 can be calculated as a greatest value with respect to height of a roughness curve element, in terms of the surface of the insulating-resin coating 20. The maximum depth of the unevenness on the surface of the insulating-resin coating 20 can be measured in the same manner as the method of measuring the maximum depth of the unevenness on the surface of the compact 10 described above. Specifically, as illustrated in FIG. 3, a roughness curve with respect to the surface of the insulating-resin coating 20 is acquired, and only reference length L is drawn in a direction of a mean line, from the roughness curve. The mean line associated with a drawn portion is defined as an X axis, and a height direction is defined as a Z axis: subsequently, with respect to each roughness curve element, peak height and valley depth are measured, and then height Zt ($=Zt_1, Zt_2, Zt_3, \ldots Zt_i, \ldots Zt_m$) is calculated. Further, for the reference length L, a greatest value (in the case of FIG. 3, $Zt_i$) with respect to the height Zt of the roughness curve elements is set as the maximum depth of the unevenness. More specifically, the maximum depth of unevenness on the surface of the insulating-resin coating 20 is measured according to JIS B601:2001, by using a surface-roughness measuring instrument (SURFCOM1400D-3DF) manufactured by Tokyo Seimitsu Co., Ltd. A value of the maximum height Rz of roughness curve is set as the maximum depth of the unevenness, in a case of a reference length of 0.8 mm and a measured length of 4.0 mm (5 times greater than the reference length) with respect to a given roughness curve. Note that the measured length is required to be 2.0 mm or more.

(Thickness of Insulating-Resin Coating)

A thickness of the insulating-resin coating 20 is preferably in the range of from 25 µm to 100 µm. A portion having a thin film thickness is not easily formed locally as a film thickness of the insulating-resin coating 20 is increased. A maximum depth of unevenness on the surface of the insulating-resin coating 20 tends to be decreased, as well as electric insulation (withstanding voltage) for the insulating-resin coating 20 being increased. With the thickness of the insulating-resin coating 20 being greater than or equal to 25 µm, electric insulation provided by the insulating-resin coating 20 can be sufficiently ensured. With the thickness of the insulating-resin coating 20 being smaller than or equal to 100 µm, the insulating-resin coating 20 is not too thick, and when an electromagnetic part is constructed using the powder magnetic core 1, a current flowing to a coil can be reduced, as well as ability to reduce the electromagnetic part in size. The thickness of the insulating-resin coating 20 is, for example, 30 µm or more, and more preferably 45 µm or more.

A thickness of the insulating-resin coating 20 can be calculated by observing cross-sections perpendicular to the surface of the insulating-resin coating 20, with a light microscope, or the like to measure film thicknesses; and calculating a mean value of measured values of film thicknesses. In the present embodiment, respective film thicknesses at 10 points are measured per field of view, and a mean value of the film thicknesses, which are measured by observing them in 10 different fields of view, is set as the thickness of the insulating-resin coating 20. For example, magnification of the light microscope is 450 times (0.14 mm$^2$/field of view).

When a compact 10 has flat face section(s) and corner section(s), a thickness of an insulating-resin coating (which may be hereinafter referred to as a "corner-section coating") that covers a given corner section of the compact 10 is preferably thick as much as possible in terms of ensuring electric insulation. The thickness of the corner-section coating is, for example, 25 µm or more, and preferably 40 µm or more. In general, when an insulating-resin coating 20 is formed on the surface of a given compact 10, a portion other than corner section(s) of the compact 10, i.e., an insulating-resin coating that covers a given flat face section (which may be hereinafter referred to as a "flat face section coating") tends to be thicker than a corner-section coating. Thereby, when a thickness of a corner-section coating is greater than or equal to 25 μm, an insulating-resin coating 20 having a sufficient thickness is formed from a flat face section to a corner section of the compact 10. In such a manner, the thickness of the insulating-resin coating 20 formed on the surface of the compact 10 is preferably greater than or equal to 25 μm, regardless of the presence or absence of a corner section of the compact 10. Thereby, electric insulation between the compact 10 and a coil can be sufficiently ensured. An upper limit of the thickness of the corner-section coating is preferably about 100 μm, for example. On the other hand, for example, a thickness of the flat face section coating is about 0.7 to 1.3 times the thickness of a corner-section coating.

The "corner section" herein means a ridge line portion formed by adjacent two flat face sections meeting. For example, when a corner section of the compact 10 is roundly chamfered, a thickness of a corner-section coating refers to a thickness of an insulating-resin coating 20 in a normal direction of a curved ridge line, which is formed by round-chamfering with respect to a cross-section of the powder magnetic core 1. When a corner section of the compact 10 is sharply chamfered, it refers to a thickness of the insulating-resin coating 20 in a normal direction with respect to a linear ridge line formed by sharp-chamfering. In particular, in the case of round-chamfering, a mean value of thicknesses of the insulating-resin coating 20 in multiple normal directions may be set as the thickness of a given corner-section coating. On the other hand, when there is no chamfered portion, a thickness of the insulating-resin coating 20 in a direction of bisecting respective faces extending from two flat face sections, which form a corner section, is set as the thickness of a given corner-section coating. The thickness of a given corner-section coating can be measured by cross-section observation of the powder magnetic core 1, with a light microscope, or the like, for example. The sharp chamfering means that a corner where edges meet is cut away to make a flat face. The round chamfering means that a corner where edges meet is cut away to make a rounded surface. A specific method of the sharp-chamfering or round-chamfering is not limited to a case of cutting away a corner where edges meet, and may be performed using a mold in which a portion corresponding to a chamfered portion is shaped, or the like.

(Filler)

The insulating-resin coating 20 may include insulating filler(s). In this case, a plurality of fillers are dispersed in the insulating-resin coating 20, thereby improving electric insulation for the insulating-resin coating 20. Specifically, a pinhole extending in a thickness direction of the insulating-resin coating 20 is divided by the filler(s). Thereby, the pinhole penetrating in the thickness direction that is from a surface of the insulating-resin coating 20 to a surface of the compact 10 is more effectively prevented from being generated. Further, when the insulating-resin coating 20 is formed on a surface of a corner section in the compact 10, with the resin including the filler(s), movement of the resin that is not solidified, from the corner section to a flat face section, is easily suppressed during painting of the resin. Thereby, a corner-section coating is prevented from being locally thin, and thus a ratio of a thickness of the corner-section coating to a thickness of the flat face section coating can be improved.

Filler material includes ceramics with highly electric resistance. For example, oxide(s) or nitride(s) including at least one element that is selected from among Mg, Si, Al, Mo, Ca, Ti, and Zn are used. More specifically, magnesium silicate, silica, alumina, titanium oxide, aluminum nitride, or the like is used.

The filler shape is not particularly restricted. The filler may be a thin section or particulate. For example, when the filler is a thin section, preferably, the thickness is in the range of from 0.1 μm to 5 μm, the width is in the range of from 5 μm to 30 μm, and the length is in the range of from 5 μm to 30 μm. Further, when the filler is particulate, preferably, the mean particle size is in the range of from 0.1 μm to 10 μm. With the thin section filler that is 0.1 μm or more in thickness and that is 0.5 μm or more in width and length, or, with the mean particle size of particulate fillers being 0.1 μm or more, the pinhole is easily divided, and thus an effect of improving electric insulation for the insulating-resin coating 20 is easily obtained. On the other hand, with the thin section filler that is 5 μm or less in thickness and that is 30 μm or less in width and length, or, with the mean particle size of particulate fillers being 10 μm or less, the fillers are not too large, and are more likely to be uniformly dispersed in the insulating-resin coating 20. Thereby, the thickness of the insulating-resin coating 20 can be thin as much as possible, as well as enabling to provide the insulating-resin coating 20 with excellent electric insulation.

A filler content depends on the material or shape of the filler. For example, when the insulating-resin coating 20 is taken as 100% by mass, preferably, the filler content is in the range of from 30 to 70% by mass. With the filler content in the insulating-resin coating 20 being 30% by mass or more, the filler(s) are sufficiently present in the insulating-resin coating 20, and thus the electric insulation provided by the insulating-resin coating 20 can be sufficiently improved. On the other hand, with the filler content being 70% by mass or less, in a case of forming the insulating-resin coating 20, fluidity of the resin is easily ensured during painting of the resin. Thereby, a thickness of the insulating-resin coating 20 can be wholly uniform, and thus the insulating-resin coating 20 can have excellent electric insulation.

(Breakdown Voltage Across Insulating-Resin Coating)

A breakdown voltage across the insulating-resin coating 20 preferably exceeds 600 V. With the breakdown voltage across the insulating-resin coating 20 exceeding 600 V, the electric insulation (withstanding voltage) provided by the insulating-resin coating 20 is sufficiently increased. An upper limit of the breakdown voltage across the insulating-resin coating 20 is not particularly restricted. For example, the upper limit is lower than or equal to 3000V, in terms of insulating characteristics of resin that forms the insulating-resin coating 20, a coating thickness (film thickness), or the like. The breakdown voltage across the insulating-resin coating 20 depends on a use condition of the powder magnetic core 1, or the like. The breakdown voltage is, for example, 700V or more, and more preferably 1000V or more.

The breakdown voltage across the insulating-resin coating 20 is measured as follows. An electrode is attached to a surface of the insulating-resin coating 20, and an electrode is attached to a surface (non-painted surface in the surface of a compact 10) of a compact 10 that is not covered by the insulating-resin coating 20. A detected current flowing to the electrodes is measured when a constant voltage is applied across the electrodes for 1 minute. Further, an applied voltage is increased in stages, and a voltage value in a case where a detected current is 1 mA or more is set as the breakdown voltage.

With respect to the powder magnetic core 1 according to the embodiment, a portion of the surface of the compact 10 is covered by the insulating-resin coating 20. A ratio of the area of the insulating-resin coating 20 to the surface of the compact 10 is lower than or equal to 85%. In such a manner, in a case of painting resin on the surface of the compact 10 to form the insulating-resin coating 20, the resin is painted on a portion of the surface of the compact 10, instead of the entire surface of the compact 10. Thus, the entire surface of the compact 10 is not covered by resin. Thereby, even when the air in pores in the compact 10 is thermally expanded during heat treatment and after painting, the air can escape from a non-painted surface in the surface of the compact 10. The thermally expanded air can avoid penetrating the resin on a painted surface and escaping, thereby preventing the generation of pinholes. With an area ratio of the insulating-resin coating 20 being 85% or less, an area of the non-painted surface that serves as a path of the air escaping can be sufficiently secured. Accordingly, it is possible to effectively prevent the generation of pinholes in the insulating-resin coating 20.

Further, with a maximum depth of unevenness on the surface of the insulating-resin coating 20 being 20 µm or less, it is unlikely that a portion having a thin film thickness is locally formed in the insulating-resin coating 20. Thereby, there is no pinhole or portion having a locally thin film thickness in the insulating-resin coating 20. Accordingly, the powder magnetic core 1 includes the insulating-resin coating 20 that provides increased electric insulation.

<<Application of Powder Magnetic Core>>

The powder magnetic core 1 according to the embodiment can be used for a magnetic core (core) of an electromagnetic part (in the example in FIG. 1, a motor). With the powder magnetic core 1 including the insulating-resin coating 20 that provides increased electric insulation, when a coil is disposed and an electromagnetic part is configured, electric insulation can be ensured with respect to the coil.

<Electromagnetic Part>

A given electromagnetic part according to the embodiment includes the powder magnetic core 1 according to the embodiment and includes a coil disposed on the powder magnetic core 1. When the electromagnetic part is configured using the powder magnetic core 1 illustrated in FIG. 1, a coil (not shown) is disposed in the outer periphery of each teeth section 3 of the powder magnetic core 1 on which the insulating-resin coating 20 is provided.

With respect to the electromagnetic part according to the embodiment, the electric insulation between the powder magnetic core 1 and the coil can be ensured by the insulating-resin coating 20 provided on the powder magnetic core 1.

Test Example 1

By painting resin on a surface of a given compact to form an insulating-resin coating, samples of powder magnetic cores were produced as shown in Table 1.

(Compact)

As soft magnetic powder, powder formed of pure iron (mean particle size (D50): 200 µm) was prepared. In this case, the mean particle size (D50) means a particle size in a case where the sum of mass, which is measured by a device for measuring laser diffraction; scattering type particle size; and particle size distribution, indicates 50%. The prepared soft magnetic powder was manufactured by water atomization. A particle surface of the soft magnetic powder was coated with a phosphate coating, so that an insulating film was formed. A film thickness of the insulating film was about 100 nm.

The prepared soft magnetic powder was filled into a mold and was compacted, so that a plurality of cylindrical compacts each of which had an inner diameter of 20 mm, an outer diameter of 30 mm, and height of 20 mm were formed. After compacting, the compacts in a nitrogen atmosphere were heat-treated at a temperature of 500 degrees C. for 15 minutes. In this case, various compacts with different relative densities were obtained by changing compacting pressure during compacting. In addition, some compacts were immersed in a solution of manganese phosphate and were treated with manganese phosphate, so that manganese phosphate based-phosphate coatings were formed on surfaces of the respective compacts. A film thickness of each phosphate coating was about 3 µm.

With respect to each produced compact, weight and volume of a given compact were measured to calculate actual density, and then relative density was calculated based on the actual density and true density (density of pure iron powder with an insulating film). Further, a maximum depth of unevenness on a surface of a given compact was evaluated. In this case, surface roughness of an inner periphery of a given compact is measured, and then a maximum depth of unevenness on the surface of a given compact is calculated as a greatest value with respect to height of roughness curve elements, from an obtained roughness curve. Reference length of the roughness curve was 4 mm, and evaluation length of the roughness curve was 5 times greater than the reference length.

Table 1 shows relative density with respect to each compact used in a sample of a given powder magnetic core, as shown in Table 1, as well as a maximum depth of unevenness on a surface of each compact.

(Insulating-Resin Coating)

Next, epoxy based resin, fluorine based resin, and polyimide (PI) resin were prepared. Subsequently, a surface of each produced compact was painted with corresponding resin, and then the resin was heat-treated for curing, so that a given insulating-resin coating was formed. The epoxy based resin and the fluorine based resin were each dissolved in a solvent and were each sprayed onto a surface of a given compact. The polyimide based resin was electrodeposited on a surface of a given compact.

In this case, in a case of painting resin on the surface of a given compact, by changing a ratio of an area of an insulating-resin coating to a surface of the compact; and an amount of painting (an adhered amount of resin) per unit area, respectively, an area ratio of the insulating-resin coating; and a film thickness of the insulating-resin coating were changed. Specifically, the samples of the different powder magnetic cores were produced as shown in Table 1. When a portion of a surface of a given compact was painted with resin, masking was performed such that masking tape was applied to a non-painted surface in the surface of the compact.

Among the samples shown in Table 1, for samples (Nos. 12, 16, and 17) in each of which an area ratio of an insulating-resin coating was 100%, resins were each painted on the entire surface of a given compact to form a given insulating-resin coating. For samples (Nos. 1 to 4, 7 to 10, 14, and 15) in each of which an area ratio of an insulating-resin coating was 52.0%, resins were each only painted on an inner periphery and both end faces of a given compact to form a given insulating-resin coating. For a sample (No. 5) indicating 85.0% and a sample (No. 13) indicating 90.0%, in terms of each area ratio of a given insulating-resin coating, resins were each painted on an inner periphery, both end faces, and a portion of an outer periphery of a given compact to form the given insulating-resin coating. For a sample (No. 6) indicating 32.0% in terms of an area ratio of a given insulating-resin coating, resin was only painted on an inner periphery of a given compact to form the given insulating-resin coating. For samples (No. 11a and 11b) each indicating 0% in terms of an area ratio of a given insulating-resin coating, resins were each not painted on a surface of a given compact, and as a result, no insulating-resin coatings were formed.

A surface of a given insulating-resin coating was observed with a SEM, and the presence or absence of pinhole in the insulating-resin coating was detected. In detecting the presence or absence of pinhole, it was determined whether a pinhole with a diameter of 100 μm or more was present in a field of view with a 1 cm-side square. When there was even one pinhole in different 10 fields, it was detected as "presence of pinhole". When there was no pinhole, it was detected as "absence of pinhole". As a result, for samples (Nos. 12, 16, and 17) each indicating 100% in terms of an area ratio of a given insulating-resin coating; and the sample (No. 13) indicating 90.0%, they were each detected as "presence of pinhole". Even when a ratio of an area of a given insulating-resin coating was 85% or less, for the samples (No. 14 and 15) in each of which a maximum depth of unevenness on a surface of a given insulating-resin coating exceeded 20 μm, they were each detected as "presence of pinhole". On the other hand, for samples (Nos. 1 to 10) in each of which an area ratio of a given insulating-resin coating was 85% or less and a maximum depth of unevenness on a surface of the insulating-resin coating was 20 μm or less, they were each detected as "absence of pinhole".

With respect to the samples of the respective powder magnetic cores on each of which a given insulating-resin coating was formed, the mean thickness was calculated by measuring a film thickness of each insulating-resin coating. Further, a maximum depth of unevenness on a surface of a given insulating-resin coating of each powder magnetic core was evaluated. In this case, after measuring surface roughness of an insulating-resin coating formed in an inner periphery of a given compact, a maximum depth of unevenness on the surface of the insulating-resin coating was calculated as a greatest value with respect to height of roughness curve elements, from an obtained roughness curve. Reference length of the roughness curve was 4 mm, and evaluation length of the roughness curve was 5 times greater than the reference length. Note that, for the samples (Nos. 12 to 17) with pinhole(s) which existed in respective given insulating-resin coatings, maximum depths of unevenness on the surfaces of the insulating-resin coatings were each determined by measuring surface roughness of a portion in which a pinhole was not present in the surface of a given insulating-resin coating.

Table 1 shows an area ratio of an insulating-resin coating, a thickness of the insulating-resin coating, and a maximum depth of unevenness on a surface of the insulating-resin coating, with respect to each sample of a given powder magnetic core shown in Table 1.

For each sample of a given powder magnetic core shown in Table 1, electric insulation (withstanding voltage) was evaluated by measuring a breakdown voltage. The breakdown voltage was measured as follows. An electrode was attached to a surface of an insulating-resin coating formed in an inner periphery of a given compact. An electrode was attached to a face that was not covered by the insulating-resin coating in an outer periphery of the compact. A constant voltage was applied across two electrodes for 1 minute. Next, a voltage applied across the two electrodes was increased in stages of 100V. A voltage value (withstanding voltage) was measured when a detected current flowing to the electrodes was 1 mA or more. The results are shown in Table 1. Note that, for samples (Nos. 12, 16, and 17) in each of which an insulating-resin coating was formed on the entire surface of a given compact; and samples (Nos. 11a and 11b) in each of which an insulating-resin coating was not formed, electrodes were respectively attached to an inner periphery and an outer periphery of a given powder magnetic core. Note that, for each sample in which an insulating-resin coating was not formed, a detected current was greater than or equal to 1 mA at a level of an applied voltage of 100 V, and a breakdown voltage was less than 100V.

TABLE 1

| | COMPACT | | | INSULATING-RESIN COATING | | | | | |
|---|---|---|---|---|---|---|---|---|---|
| SAMPLE No. | RELATIVE DENSITY (%) | PRESENCE OR ABSENCE OF PHOSPHATE FILM | MAXIMUM DEPTH OF UNEVENNESS (μm) | RESIN | AREA RATIO (%) | THICKNESS (μm) | MAXIMUM DEPTH OF UNEVENNESS (μm) | PRESENCE OR ABSENCE OF PINHOLE | BREAKDOWN VOLTAGE (V) |
| 1 | 94.2 | PRESENCE | 21 | FLUORINE SYSTEM | 52.0 | 48.8 | 12 | ABSENCE | 1100 |
| 2 | 94.2 | PRESENCE | 21 | FLUORINE SYSTEM | 52.0 | 97.6 | 7 | ABSENCE | 2300 |
| 3 | 94.2 | PRESENCE | 21 | FLUORINE SYSTEM | 52.0 | 26.1 | 17 | ABSENCE | 700 |
| 4 | 94.2 | ABSENCE | 33 | FLUORINE SYSTEM | 52.0 | 39.2 | 19 | ABSENCE | 800 |
| 5 | 94.2 | PRESENCE | 21 | FLUORINE SYSTEM | 85.0 | 49.2 | 14 | ABSENCE | 1100 |
| 6 | 94.2 | PRESENCE | 21 | FLUORINE SYSTEM | 32.0 | 48.5 | 12 | ABSENCE | 1100 |
| 7 | 91.5 | PRESENCE | 34 | FLUORINE SYSTEM | 52.0 | 49.0 | 18 | ABSENCE | 800 |
| 8 | 94.2 | PRESENCE | 21 | EPOXY SYSTEM | 52.0 | 49.8 | 14 | ABSENCE | 1300 |
| 9 | 94.2 | ABSENCE | 33 | EPOXY SYSTEM | 52.0 | 41.3 | 18 | ABSENCE | 900 |
| 10 | 94.2 | PRESENCE | 21 | PI SYSTEM | 52.0 | 49.4 | 20 | ABSENCE | 700 |
| 11a | 94.2 | PRESENCE | 21 | — | 0 | — | — | — | 100 |

TABLE 1-continued

| | COMPACT | | | INSULATING-RESIN COATING | | | | | |
|---|---|---|---|---|---|---|---|---|---|
| SAMPLE No. | RELATIVE DENSITY (%) | PRESENCE OR ABSENCE OF PHOSPHATE FILM | MAXIMUM DEPTH OF UNEVENNESS (μm) | RESIN | AREA RATIO (%) | THICKNESS (μm) | MAXIMUM DEPTH OF UNEVENNESS (μm) | PRESENCE OR ABSENCE OF PINHOLE | BREAKDOWN VOLTAGE (V) |
| 11b | 94.2 | ABSENCE | 33 | — | 0 | — | — | — | 100 |
| 12 | 94.2 | PRESENCE | 21 | FLUORINE SYSTEM | 100 | 48.3 | 20 | PRESENCE | 500 |
| 13 | 94.2 | PRESENCE | 21 | FLUORINE SYSTEM | 90.0 | 49.2 | 18 | PRESENCE | 600 |
| 14 | 89.7 | PRESENCE | 52 | FLUORINE SYSTEM | 52.0 | 48.6 | 34 | PRESENCE | 500 |
| 15 | 89.7 | PRESENCE | 52 | FLUORINE SYSTEM | 52.0 | 99.2 | 31 | PRESENCE | 600 |
| 16 | 94.2 | PRESENCE | 21 | EPOXY SYSTEM | 100 | 49.2 | 24 | PRESENCE | 400 |
| 17 | 94.2 | PRESENCE | 21 | PI SYSTEM | 100 | 48.7 | 27 | PRESENCE | 300 |

From Table 1, for samples Nos. 1 to 10, in each of which an area ratio of a given insulating-resin coating was 85% or less and a maximum depth of unevenness on a surface of the insulating-resin coating was 20 μm or less, breakdown voltages (withstanding voltages) across the respective insulating-resin coatings each exceeded 600 V. It is considered that an insulating-resin coating with increased electric insulation was obtained, because, in each of these samples, there was no pinhole or locally thin portion in a given insulating-resin coating.

In particular, for each sample in which a maximum depth of unevenness on a surface of a given insulating-resin coating was 15 μm or less, because a breakdown voltage was 1000V or more, the electric insulation was further increased. In particular, for a given sample in which a maximum depth of unevenness on a surface of a given insulating-resin coating was 10 μm or less, a breakdown voltage was 2000V or more. From this, it is considered that a portion having a thin film thickness is less likely to be locally formed in a given insulating-resin coating as the maximum depth of the unevenness on the surface of the insulating-resin coating is decreased, so that the electric insulation is improved. Also, in order to obtain an insulating-resin coating with a decreased maximum depth of the unevenness, surface quality of a given compact is important, and it has been found that it is desirable that relative density of a compact is increased (90% or more) and a maximum depth of unevenness on a compact surface is decreased (50 μm or less, particularly 35 μm or less).

For samples 11a and 11b in each of which an insulating-resin coating was not included; or, samples Nos. 12 and 17 in each of which an area ratio of a given insulating-resin coating was higher than 85%, or in each of which a maximum depth of unevenness on a surface of a given insulating-resin coating was greater than 20 μm, breakdown voltages across the insulating-resin coatings were each 600 V or less, and the electric insulation was not sufficiently achieved. In this regard, for the samples in each of which an area ratio of a given insulating-resin coating was higher than 85%, the electric insulation is considered to be decreased, because there were pinholes in each insulating-resin coating. Additionally, for the samples in each of which a maximum depth of unevenness on a surface of a given insulating-resin coating exceeded 20 μm, the electric insulation is considered to be decreased, because a portion having a thin film thickness was formed locally in the insulating-resin coating or there were pinholes.

REFERENCE SIGNS LIST

1 powder magnetic core
10 compact
20 insulating-resin coating
2 yoke section
3 teeth section The inevntion claimed is:

1. A powder magnetic core comprising
   a compact including soft magnetic powder;
   a phosphate coating in a surface layer of the compact; and
   an insulating-resin coating that covers a portion of a surface of the surface layer of the compact, the insulating-resin coating being situated on the phosphate coating,
   wherein a ratio of an area of the insulating-resin coating to a surface area of the compact is greater than or equal to 32% and lower than or equal to 85%, and wherein a maximum depth of unevenness on a surface of the insulating-resin coating is greater than or equal to 7 μm and smaller than or equal to 20 μm,
   wherein a film thickness of the phosphate coating is greater than or equal to 2 μm and less than or equal to 7 μm,
   wherein a dielectric breakdown voltage across the insulating-resin coating is higher than or equal to 800 V, and
   wherein a surface of the insulating-resin coating is free of a pinhole having a diameter of 100 μm or greater.

2. The powder magnetic core according to claim 1, wherein relative density of the compact is higher than or equal to 90%, and wherein a maximum depth of unevenness on the surface of the compact is smaller than or equal to 50 μm.

3. The powder magnetic core according to claim 1, wherein the insulating-resin coating has a thickness of from 25 μm to 100 μm.

4. The powder magnetic core according to claim 1, wherein the insulating-resin coating comprises at least one of epoxy based resin, fluorine based resin, and polyimide based resin.

5. The powder magnetic core according to claim 1, wherein the insulating-resin coating comprises a filler formed of an oxide or nitride, the oxide or the nitride comprising at least one element selected from among Mg, Si, Al, Mo, Ca, Ti, and Zn.

6. The powder magnetic core according to claim 1, wherein a compact includes a flat face section and a corner section,
- wherein the insulating-resin coating that covers the corner section has a thickness of from 25 μm to 100 μm, and
- wherein a thickness of the insulating-resin coating that covers the flat face section is 0.7 to 1.3 times the thickness of the insulating-resin coating that covers the corner section.

7. An electromagnetic part comprising:
the powder magnetic core according to claim 1; and
a coil disposed on the powder magnetic core.

8. The powder magnetic core according to claim 1, wherein the phosphate coating is formed by phosphate treatment to seal the surface of the surface layer of the compact.

\* \* \* \* \*